United States Patent

Patterson

[15] 3,689,099
[45] Sept. 5, 1972

[54] BABY STROLLERS

[72] Inventor: David D. Patterson, Seward, Nebr.

[73] Assignee: Herschal F. Garhan, Rising City, Nebr.

[22] Filed: Dec. 4, 1968

[21] Appl. No.: 810,052

Related U.S. Application Data

[62] Division of Ser. No. 599,128, Dec. 5, 1966, Pat. No. 3,421,774.

[52] U.S. Cl. .................................. 280/38, 280/41 A
[51] Int. Cl. .......................................... B62d 21/14
[58] Field of Search .................... 280/36 B, 41 A, 38

[56] References Cited

UNITED STATES PATENTS

| | | | |
|---|---|---|---|
| 3,222,081 | 12/1965 | Harmon | 280/36 B |
| 3,084,949 | 4/1963 | Forster | 280/36 B |
| 2,615,725 | 10/1952 | Person | 280/41 A |
| 3,326,570 | 6/1967 | Burham | 280/36 B |
| 3,235,279 | 2/1966 | Smith | 280/36 B |

*Primary Examiner*—Benjamin Hersh
*Assistant Examiner*—Robert R. Song
*Attorney*—John D. Pope, III

EXEMPLARY CLAIM

1. A collapsible baby stroller comprising a plurality of frames including an upper frame, a front frame and a rear frame, a hinge means for swingably connecting the upper ends of the front and rear frame to the upper frame in close proximity to one another in such a manner that the frames can be optionally folded from an erected position wherein the frames are disposed at predetermined angles with respect to one another to a collapsed position wherein the frames are presented in side-by-side relation, frame locking means for holding the frames in the erected position, a backrest hingedly mounted with respect to the frames, a backrest locking means for releasably holding the backrest at a predetermined angle with respect to the frames, a seat, a support means for holding the seat substantially horizontal when the frames are in the erected position, connecting links interconnecting the front and rear frame in spaced relation to the hinge means, means for hingedly connecting the backrest at its lower end to said connecting links, said backrest locking means releasably engaging the upper frame for holding the backrest in a substantially upstanding position.

3 Claims, 12 Drawing Figures

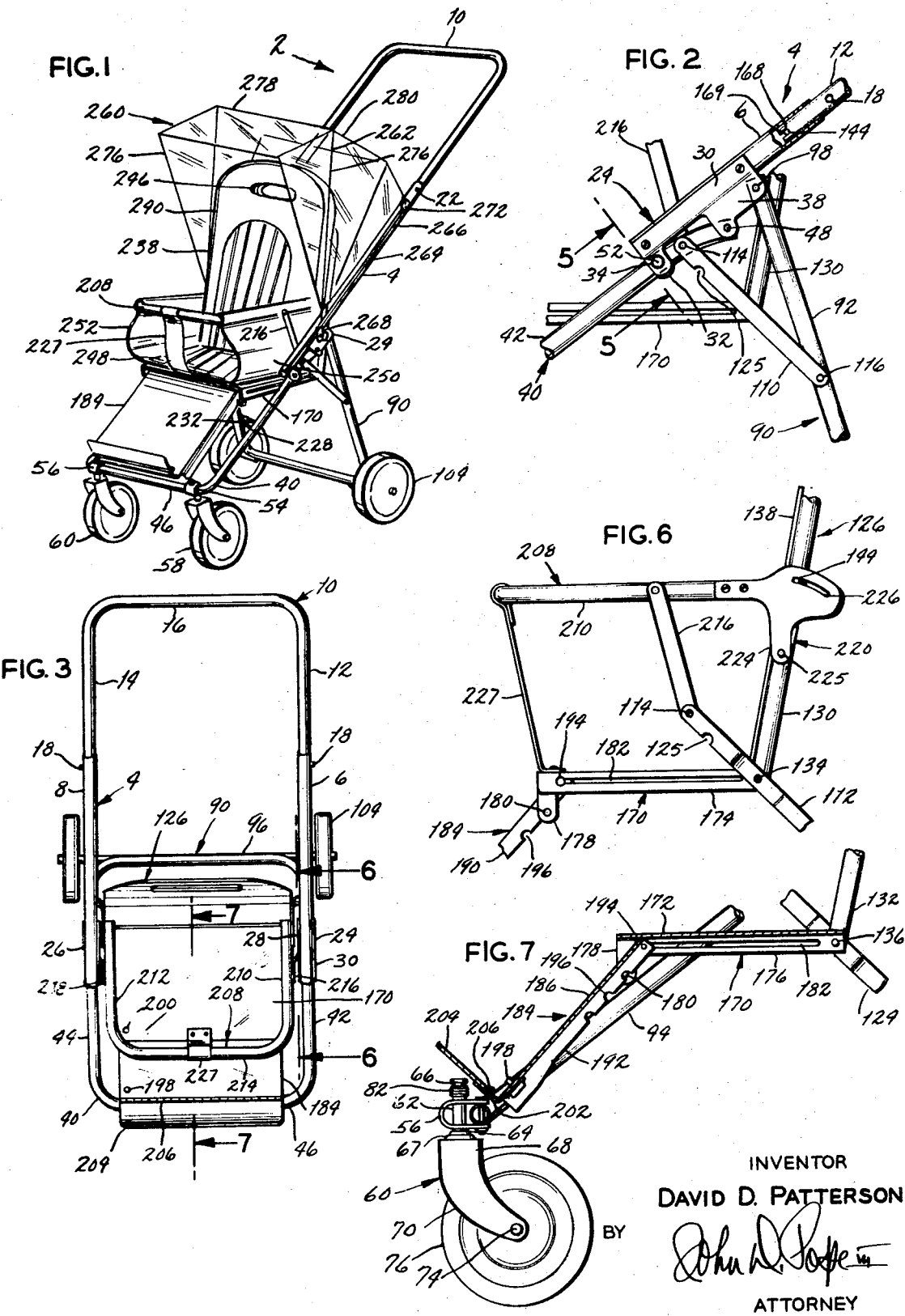

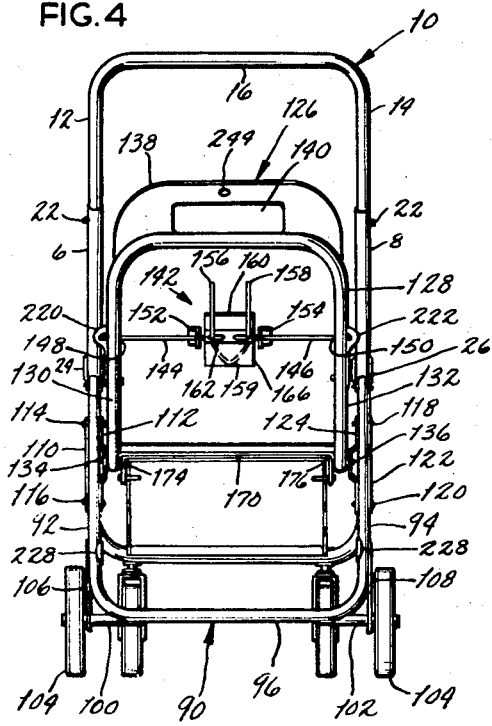
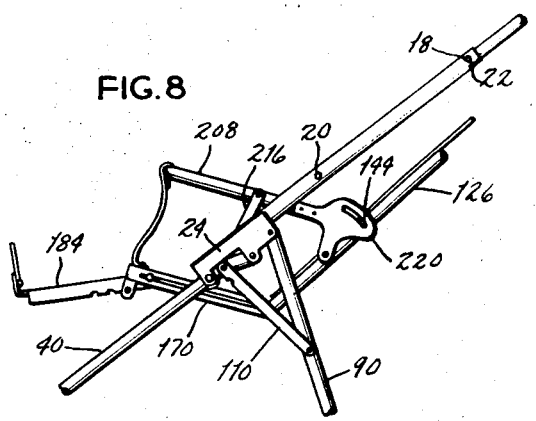
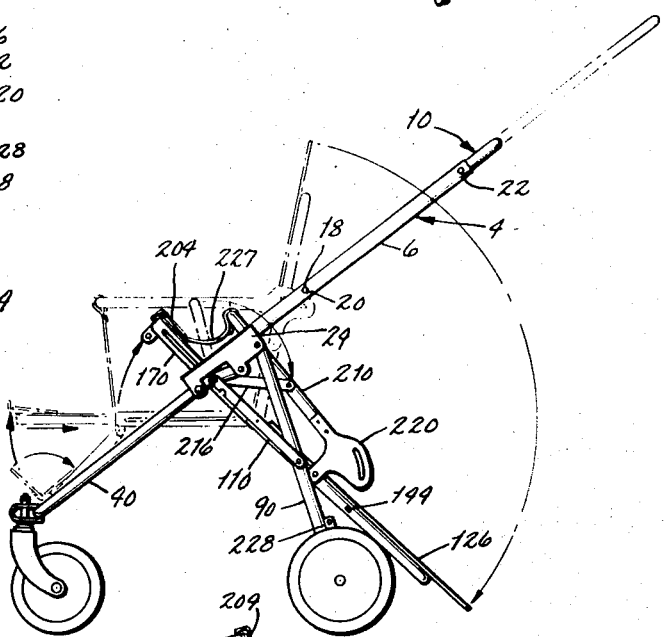
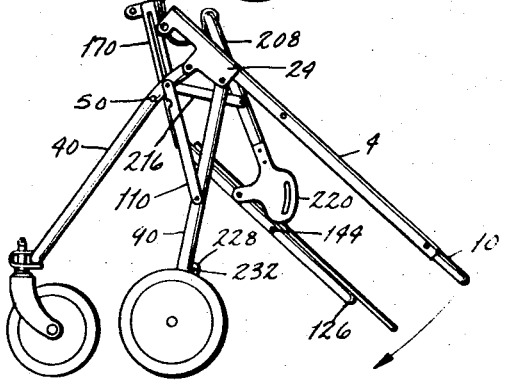

PATENTED SEP 5 1972 3,689,099

INVENTOR
DAVID D. PATTERSON
BY
John D. Pope
ATTORNEY

BABY STROLLERS

This is a division of application Ser. No. 599,128, filed Dec. 5, 1966, now U.S. Pat. NO. 3,421,774.

This invention relates to baby strollers and, more particularly, to collapsible baby strollers.

A number of different types of baby strollers are currently being marketed and some of these strollers are collapsible to a certain extent to more conveniently enable the user to fit the stoller into restricted areas such as automobile trunks or hall closets. These baby stollers, however, often incorporate a multitude of lock-type fasteners and other devices to achieve this end and these devices are often difficult to manipulate, requiring considerable time and subjecting the user of the stoller to substantial inconvenience. Moreover, such stollers do not collapse into a very compact, lightweight package which can be conveniently grasped and carried onto a bus or other vehicle where space is at a premium. On the contrary, most of the collapsible baby stollers of current manufacture merely depress into a variety of relatively compressed configurations which are too long and awkward to carry any appreciable distance by hand and, furthermore, have numerous protrusions which can easily snag clothing, catch on objects, and cause painful cuts and abrasions.

Generally speaking, the present invention relates to a baby stroller having front and rear frames which are hingedly connected to an upper frame at the lower extremity of such upper frame. Frame-locking means are provided for holding the front frame adjacent the upper frame as an extension thereof. Suitable links hold the front and rear frames at predetermined angles when the stroller is in erected position and a backrest and seat are hingedly secured to such links. Backrest locking means are provided for holding the backrest at a predetermined angle with respect to the frames. A seat is supported by a handrail located in upwardly spaced relation thereto and the handrail, in turn, is supported by the backrest and front frame. When it is desired to transform the stroller of the present invention into a compact carrying package, the frame and backrest locking means are released, whereupon the front and upper frames, as well as the backrest, can be folded toward and against the rear frame to form a compact carrying package. In a modified form of the present invention the frame locking means is actuated as the backrest folds into the collapsed position.

Among the several objects of the present invention may be noted the provision of a baby stroller which can be collapsed into a compact package for convenient carrying; the provision of a baby stroller of the type stated which collapses to a carrying package conveniently adapted for grasping; the provision of a baby carriage which employs simple and easily manipulated locking means to hold it in the erect position; the provision of a baby stroller having a backrest which can be optionally placed in a substantially upright position or a reclined position; the provision of a baby carriage having a canopy which does not obstruct the user's view of the child in the stroller; and the provision of a baby stroller which is attractive in appearance, simple and rugged in construction, and easy and economical to manufacture. Other objects and features will be in part apparent and in part pointed out hereinafter.

The invention accordingly comprises the constructions hereinafter described, the scope of the invention being indicated in the following claims.

In the accompanying drawings, in which several of various possible embodiments of the invention are illustrated, FIG. 1 is a perspective view of a baby carriage constructed in accordance with and embodying the present invention;

FIG. 2 is a fragmentary side elevational view, partially broken away and in section, of the baby carriage showing the structural members thereof;

FIG. 3 is a top plan view of the baby carriage showing the structural portions thereof, the fabric portions and canopy being omitted;

FIG. 4 is a rear elevational view of the baby carriage;

Figure 11:
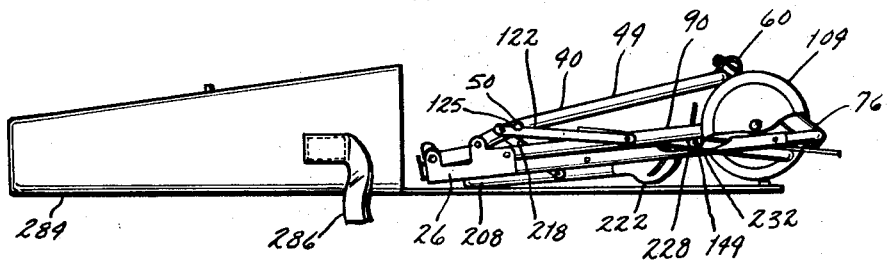
Figure 12:
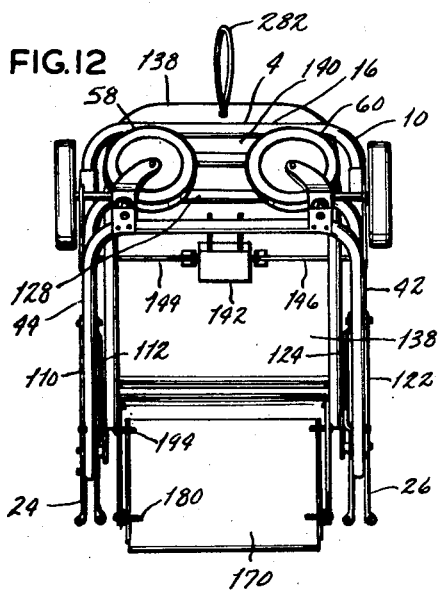

FIGS. 6 and 7 are sectional views taken along lines 6—6 and 7—7, respectively, of FIG. 3;

FIG. 8 is a fragmentary side elevational view showing the backrest in the reclined position;

FIGS. 9, 10, and 11 are side elevational views, partially in phantom, sequentially showing the steps of collapsing the baby stroller of the present invention;

FIG. 12 is a plan view of the collapsed baby stroller.

Corresponding reference characters indicate corresponding parts throughout the several views of the drawings.

Referring now to the drawings, which illustrate practical embodiments of the present invention, 2 designates a baby stroller having an upper frame 4 including tubular side members 6, 8, and a U-shaped tubular handle 10, telescopically mounted within side members 6, 8. Handle 10 includes parallel legs 12, 14, which slidably fit within tubular side members 6, 8, respectively, and are transversely connected at their upper ends by a gripping portion 16. At their lower ends, legs 12, 14, are provided with outwardly projecting spring-loaded buttons 18 which engage outwardly facing apertures 20 located intermediate the ends of the side members 6, 8, to hold handle 10 in a retracted or so-called collapsed position. Similarly, at their upper ends side members 6, 8, are provided with another pair of outwardly facing apertures 22 which are also adapted to accept spring-loaded buttons 18. When buttons 18 engage apertures 22, handle 10 will be in an extended position. The user can quickly change the position of handle 10 merely by pushing buttons 18 inwardly past the particular set of apertures 20 or 22 through which they project and simultaneously pulling or pushing on gripping portion 16.

Figure 5:
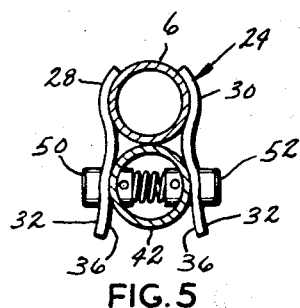
FIG. 5 is a sectional view taken along line 5—5 of FIG. 2.

Riveted or otherwise securely fastened to the lower ends of side members 6, 8, are hinge brackets 24, 26, respectively, and inasmuch as brackets 24, 26, are identical, only hinge bracket 24 will be described herein in detail. As will be seen by reference to FIGS. 2 and 5, hinge bracket 24 comprises inner and outer hinge plates 28, 30, each of which are contoured adjacent their upper margins to conform to the circular peripheral shape of side member 6. Hinge plates 28, 30, include forwardly presented downwardly projecting locking ears 32 which are provided with axially aligned opposed apertures 34 in the provision of camming surfaces 36. Rearwardly and upwardly from ears 32, plates 28, 30, are integrally provided with downwardly projecting spaced parallel hinge tabs 38.

Hingedly secured to upper frame 4 at hinge brackets 24, 26, is a front frame 40 including spaced parallel side legs 42, 44, which integrally merge at their lower ends into a transversely extending forward cross member 46. The upper ends of legs 42, 44, fit between locking ears 32 and terminate intermediate hinge tabs 38 of hinge brackets 24, 26, to which they are swingably secured by means of hinge pins 48. Operatively mounted in the upper ends of each of legs 42, 44, are spring-loaded buttons 50, 52, which project transversely therefrom and engage apertures 34 of locking ears 32, thereby holding front frame 40 in an erected position wherein legs 42, 44, form parallel extensions of side members 6, 8, respectively. In this connection, it should be noted that intermediate locking ears 32, the upper surfaces of legs 42, 44, abut against the undersurfaces of side members 6, 8, and therebeyond, that is intermediate locking ears 32 and hinge tabs 38, legs 42, 44, are bowed slightly outwardly so as to provide sufficient clearance for swinging movement with respect to upper frame 4, as best seen in FIG. 2. It is readily apparent from FIG. 1 and the foregoing description that front frame 40 can be folded over substantially onto upper frame 4 merely by pressing buttons 50, 52, inwardly and simultaneously pivoting legs 42, 44, with respect to side members 6, 8, about hinge pins 48. Conversely, when it is desired to bring front frame 40 into substantially parallel relation with respect to upper frame 4, that is into an erected position, legs 42, 44, are folded outwardly with respect to side members 6, 8, until buttons 50, 52, engage apertures 34. In the latter instance, camming surfaces 36 will cam buttons 50, 52, inwardly against the bias of their springs as legs 42, 44, pass between hinge plates 28, 30, of hinge brackets 24, 26.

At the arcuate junctures of legs 42, 44, and cross member 46, front frame 40 is provided with a pair of forwardly projecting caster brackets 54, 56, which carry caster-type wheel assemblies 58, 60. Inasmuch as wheel assemblies 58, 60, are identical, only wheel assembly 60 will be described herein in detail. Referring now to FIG. 7, wheel assembly 60 includes a vertically presented sleeve 62 mounted securely within bracket 56 in outwardly spaced relation to cross member 46, sleeve 62 being provided at its lower end with a downwardly opening bell-shaped end portion 64 having a plurality of ball bearings suitably mounted therein. Fitted through sleeve 62 is a pintle 66 which downwardly terminates at a flange 67 on which the ball bearings ride, and rigidly secured to flange 67 is a fork 68 having spaced parallel furcations 70, which are angulated with respect to pintle 66. Journaled intermediate furcations 70, on an axle 74, is a conventional rubber-tired wheel 76. Inasmuch as the axis of axle 74 is presented in offset relation to the vertical axis of pintle 666, wheel assembly 60 will always orient itself in a position wherein axle 74 is to the rear of pintle 66 and normal to the direction of travel as stroller 2 is pushed along the pavement. Pintle 66 projects upwardly beyond sleeve 62 where it is provided with a spiral spring 82 which also engages sleeve 62 and normally biases wheel assembly 60 to an inwardly facing position wherein wheel 76 is substantially parallel to cross member 46.

Also hingedly joined to upper frame 4 at hinge brackets 24, 26, is a rear frame 90 including spaced parallel legs 92, 94, which, at their lower ends, arcuately merge into a transversely extending gear cross member 96. At their upper ends, legs 92, 94, are journaled to brackets 24, 26, intermediate hinge plates 28, 30, by means of hinge pins 98 located parallel to and rearwardly from hinge pins 48. Riveted to the underside of cross member 96 at its arcuate junctures with legs 92, 94, and projecting axially outwardly therefrom beyond the outer margins of legs 92, 94, are axles 100, 102, having conventional rubber-tired wheels 104 rotatably mounted thereon. Fitted over axles 100, 102, at their lower ends and extending upwardly to legs 92, 94, respectively, where they are rigidly affixed at their upper ends, are axle braces 106, 108, which not only brace axles 100, 102, but also prevent wheels 104 from riding inwardly thereon.

Interconnecting lets 42 and 92, as will be seen by reference to FIGS. 2, 4, and 6, are spaced parallel outer and inner links 110, 112, which are journaled thereto by means of pins 114, 116, pin 114 being interposed between pin 48 and buttons 50, 52, on leg 42. Similarly interconnecting legs 44, 94, and being journaled thereto by means of pins 118, 120, respectively, are outer and inner links 122, 124. Links 110, 112, and 122, 124, in close proximity to their respective pins 114, 118, are provided with arcuate cutouts 125 for accommodating buttons 50, 52, when stroller 2 is in the collapsed position, as best seen in FIG. 11.

Hingedly fastened to inner links 112, 124, intermediate their ends, as best seen in FIGS. 4 and 6, is a backrest 126 including a U-shaped tubular back frame 128 having upstanding legs 130, 132, which are journaled at their lower ends to inner links 112, 124, by means of pins 134, 136. It should be noted that links 112, 124, are bowed slightly inwardly so that the heads of pins 134, 136, will not interfere with legs 92, 94, when stroller 2 is collapsed. Moreover, legs 130, 132, are spaced slightly inwardly from links 112, 124, by means of spacer sleeves located on pins 134, 136, all as best seen in FIG. 4. Riveted or otherwise securely fastened to the forwardly presented surfaces of back frame 128 is a backrest plate 138 which extends about frame 128 where it is provided with an elongated aperture 140. It should be noted that backrest 126 will fold rearwardly on pins 134, 136, into substantially parallel side-by-side relation with rear frame 90.

Mounted on the back face of backrest plate 138, as will be seen by reference to FIG. 4, is a lock assembly 142 including two laterally extending coaxially aligned locking rods 144, 146, which, at their outer ends, extend through and are slidably mounted in transversely extending holes 148, 150, formed in upstanding legs 130, 132, of back frame 128. At their inner ends rods 144, 146, are slidably fitted through outwardly projecting tabs 152, 154, which are riveted to backrest plate 138 and inwardly beyond tabs 152, 154, rods 144, 146, are bent at approximately right angles in the provision of unlocking levers 156, 158, which extend upwardly and terminate in close proximity to elongated aperture 140. Interposed between levers 156, 158, is a U-shaped or other suitable spring 159 having ends which engage levers 156, 158, to urge levers 156, 158, and locking rods 144, 146, apart. Levers 156, 158, are held in place with respect to backrest plate 138 by means of a guide member 160 having inwardly extending opposed notches 162 which slidably receive levers 156, 158, to prevent rods 144, 146, from rotating within tabs 142, 154, and holes 148, 150. Guide member 160 outwardly terminates at a lip 166 which extends over and engages the ends of U-shaped spring 159 to maintain such spring in operative engagement with levers 156, 158. Outwardly beyond legs 130, 132, locking rods 144, 146, project into opposed apertures 168 formed in side members 6, 8, to hold backrest 126 at a predetermined angle with respect to upper frame 4 as well as with respect to front and rear frames 40, 90, respectively. It should be noted that the ends of legs 12, 14, of handle 10 are provided with axially extending elongated cutouts 169 which accommodate the inwardly projecting ends of rods 144, 146, when handle 10 is in the collapsed position, as best seen in FIG. 2.

Also hingedly connected to inner links 112, 124, as well as to backrest 126 at pins 134, 136, is a seat 170 including a seat plate 172 provided along its side margins with depending side flanges 174, 176, which are secured to legs 130, 132, of frame 128 at their rear ends by pins 134, 136. At their forward ends, flanges 174, 176, merge into depending ears 178, each having an inwardly projecting pin 180. Intermediate pins 180 and pins 134, 136, flanges 174, 176, are provided with longitudinally extending slots 182.

Projecting obliquely downwardly in close proximity to the front margin of seat 170 is a legrest 184 integrally including a front plate 186 and side flanges 190, 192, the latter of which are secured to flanges 174, 176, of seat 170 by pins 194 which, in turn, are slidably fitted with slots 182. At their upper ends, flanges 190, 192, are provided with a plurality of spaced notches 196 which receive inwardly projecting pins 180. In this manner legrest 184 can be held in a plurality of angulated positions with respect to seat 170 and can be lifted upwardly until substantially parallel to seat 170 for subsequent insertion under seat 170, in which case pins 194 will ride in elongated slots 182 while the bottom margin of flanges 190, 192, will slide on pins 180. Mounted on front plate 186 and projecting upwardly therefrom in close proximity to flange 190 is a spring-loaded button 198 which engages an aperture 200 located in seat plate 172 when legrest 184 is slid to its fullest extent beneath seat 170. At its lower or front margin front plate 186 is turned upwardly in the provision of a lip 202 to which a treadle 204 is journaled by means of a transversely extending hinge pin 206. Thus, treadle 204 can be folded over toward front plate 196.

Projecting forwardly from backrest 126 in upwardly spaced substantially parallel relation to seat 170 is a handrail 208 sized to fit around a child's torso when the child sits on seat 170. Handrail 208 includes side bars 210, 212, which integrally merge into a front bar 214. Intermediate their ends side bars 210, 212, are pivotally connected to links 216, 218, which are, in turn, pivotally connected at their lower ends to legs 42, 44, of front frame 40 at pins 114. As best seen in FIG. 6, side bars 210, 212, are fitted at their rear ends with hinge brackets 220, 222, having downwardly projecting ears 224 which are hingedly secured to legs 130, 132, of back frame 128 by means of pins 225. The upper portions of brackets 220, 222, are flared outwardly and provided with arcuate slots 226 through which locking rods 144, 146, project. Looped over front bar 214 and extending downwardly therefrom is a support strap 227 which is riveted to seat plate 172 in close proximity to its front margin for support purposes.

Riveted or otherwise rigidly fastened to the inwardly presented surfaces of legs 92, 94, of rear frame 90 are opposed locking tabs 228, each being outwardly flared in the provision of a camming surface and each having an aperture 232 which registers with and receives the outer ends of locking rods 144, 146, when backrest 126 is folded rearwardly.

Referring now to FIG. 1, baby stroller 2 is provided with a fabric or other suitable seat liner 238 including a padded back portion 140 mounted on backrest 126 provided with an upper flap which forms a downwardly opening pocket into which the upper portion of backrest plate 138 extends, the flap being secured thereto by means of a snap 244. Back portion 240 is further provided with an elongated cutout 246 which registers with elongated aperture 140 in backrest plate 138. At its lower margin back portion 240 is joined to a padded seat portion 248 having fabric side panels 250, 252, which are looped over side bars 210, 212, respectively, of handrail 208.

If desired, baby stroller 2 can be provided with a depending bag-like parcel carrier (not shown) which is preferably riveted or snapped to the upper end of back frame 128.

Removably mounted on upper frame 4 is a buggy-type canopy 260 including a canopy frame 262 provided with a U-shaped support rod 264 having parallel legs 266 located adjacent side members 6, 8. At their lower ends, legs 266 are provided with mounting tabs 268 which extend downwardly past hinge brackets 24, 26, to which they are secured by means of thumb screws which engage nuts welded to outer hinge plates 30. Near their upper ends, legs 266 are provided with resilient retention ears 272 which frictionally engage the outwardly presented surfaces of side members 6, 8, to hold support rod 264 in juxtaposition to side members 6, 8. Pivotally secured to legs 266 are a plurality of U-shaped canopy stays 276 and secured thereto, as well as to support rod 264, is a canopy cover 278 having a transparent plastic panel or window 280 located intermediate the bight portions of two of stays 276. This enables the user to look down and observe the child from his or her position behind stroller 2. If desired, a plurality of transversely extending depending panels can be secured to canopy cover 278 immediately below window 280 so as to block direct rays of the sun and lessen the chance of such rays striking the child. Canopy 260 can be folded into a compact configuration against upper frame 4, and, if desired, it can be removed altogether from stroller 2 by unscrewing the thumb screws.

Canopy 260 and seat liner 238 have been omitted from all but one of the figures so as to not obscure the various structural elements of stroller 2.

When the user desires to board a bus, enter an automobile or otherwise bring stroller 2 into a somewhat restricted area, stroller 2 can be easily and simply transformed into a highly compact carrying package by the manipulation of a minimum number of locking devices and structural elements as best seen in FIGS. 9 through 11. At the outset, spring-loaded buttons 18 are pushed inwardly through apertures 22 and at the same time gripping portion 16 of handle 10 is urged toward side members 6, 8, whereupon legs 12, 14, will slide telescopically into tubular side members 6, 8, until buttons 18 come to apertures 20 at which point they will spring outwardly and lock handle 10 in a collapsed position. It should be noted that axially extending cutouts 169 will receive the inwardly projecting outer end of locking rods 144, 146, so that such rods do not obstruct the axial movement of legs 12, 14. Next treadle 204 is swung over toward the face of front plate 186 and legrest 184 is lifted upwardly out of notches 196 until it is substantially parallel to seat 170, whereupon it is slid rearwardly until spring-loaded button 198 engages aperture 200 in seat plate 172, thereby locking legrest 184 to seat 170. In this position treadle 204 will be disposed over front plate 186, all as best seen in FIG. 9.

The user thereafter squeezes locking levers 156, 158, together against the bias of spring 159, thereby withdrawing the ends of locking rods 144, 146, from apertures 168 in side members 6, 8, and from arcuate slots 226 located in hinge brackets 220, 222. This permits backrest 126 to be swung downwardly into close proximity to and in overlying relation with rear frame 90. At the same time handrail 208 will move into close proximity to and substantially parallel with backrest 126 by virtue of the configuration and location of the pivotal connections formed by links 216, 218, and hinge brackets 220, 222. Support strap 227 will draw seat 170 upwardly as handrail 208 moves into a collapsed position so that it forms a continuation of collapsed backrest 126. At this juncture, however, it should be noted that the ends of locking rods 144, 146, are not brought into engagement with apertures 232 of locking tabs 228.

Subsequently buttons 50, 52, are pressed inwardly into their respective apertures 34 and front frame 40 is simultaneously folded toward upper and rear frames 4, 90, as best seen in FIG. 10. This can best be accomplished by grasping stroller 2 at hinge brackets 24, 26, lifting it until wheels 76 are off the ground, and then pushing buttons 50, 52, inwardly. When buttons 50, 52, clear their respective apertures 34 the weight of the suspended front frame 40 will cause it to swing downwardly, free from locking ears 32. Inasmuch as legs 42, 92, are connected by links 110, 112, and legs 44, 94, are connected by pins 114, 116, and further in view of the locations of hinge pins 48, 114, on hinge brackets 24, 26, upper frame 4 at the same time will swing toward rear frame 90 and collapsed backrest 126 located adjacent thereto. When upper frame 4 approaches backrest 126 the latter is lifted slightly away from rear frame 90 so that gripping portion 16 of handle 10 will pass beyond the upper or outer margin of backrest plate 138. This permits side members 6, 8, of upper frame 4 to come into juxtaposition with legs 92, 94, respectively, of rear frame 90. When backrest 126 is folded back toward rear frame 90 the rear face of backrest plate 138 will engage gripping portion 16 of handle 10 and thereby hold upper frame 4 against rear frame 90 as illustrated in FIG. 11. When a slight force is applied to backrest 126 the ends of locking rods 144, 146, engage the camming surfaces of locking tabs 228 thereby urging or camming rods 144, 146, axially inwardly until they come to apertures 232, whereupon they will spring outwardly and by engaging such apertures secure backrest 126 to rear frame 90 in a side-by-side substantially flat configuration. Links 110, 112, and 122, 124, will hold legs 92, 42, and 94, 44, adjacent one another so that front frame 40 is also locked in side-by-side relation with respect to rear frame 90. As previously noted, in that position, that is in the fully collapsed position, arcuate cutouts 125 of links 110, 112, and 122, 124, will accommodate buttons 50, 52, and will not inhibit the folding of stroller 2. It should be noted that seat liner 238 and canopy 260 have been omitted from FIGS. 9 through 11 so as not to obscure the positions of the various structural elements during the various collapsing steps. It should be understood, however, that neither seat liner 238 nor canopy 160 need be removed in order to collapse stroller 2, for the former will fold with the structural elements and the latter will merely lie against upper frame 4. Neither will impede the transformation of stroller 2 into a collapsed configuration.

When completely collapsed the user can insert his hand through registered elongated cutout 246 and aperture 140 of seat linear 238 and backrest 126, respectively, and carry stroller 2 onto a bus or into some other confined area. Moreover, it is possible to provide stroller 2 with a wrist strap 282 located adjacent elongated aperture 140 as a means for more conveniently carrying stroller 2, as best seen in FIG. 12.

Also it is possible to fit collapsed stroller 2 into a carrying case 284 having a shoulder strap 286 whereby collapsed stroller 2 can be carried in an over-the-shoulder arrangement freeing both of the user's hands for other chores.

When the user again desires to use stroller 2 it can be quickly erected, simply by following the steps heretofore described in reverse order. The user reaches down, grasps levers 156, 158, between his fingers and squeezes them together until backrest 126 swings free of rear frame 90. Thereafter front frame 40 and upper frame 4 are grasped and swung away from rear frame 90 until buttons 50, 52, are cammed inwardly by camming surfaces 36 and subsequently spring outwardly into engagement with apertures 34 of locking ears 32. In this position frames 4, 40, and 90, will all be locked at predetermined angles with respect to one another. Thereafter, locking levers 156, 158, are again grasped and squeezed toward one another while backrest 126 is raised. Levers 156, 158, can either be released when the ends of locking rods 144, 146, register with the rear ends of arcuate slots 226 of brackets 220, 222, or when the ends of the rods register with opposed apertures 168 in side members 6, 8. In the former instance backrest 126 will be in a slightly reclined position as illustrated in FIG. 8 which is more suitable for naps than the fully erected position. It should be noted that hinge brackets 220, 222, if desired, can be provided with a plurality of arcuately spaced apertures in lieu of arcuate slots 226 so that backrest 126 can be optionally locked in a plurality of reclined positions.

Finally, button 198 is depressed beyond aperture 200 while legrest 184 is pulled outwardly the desired distance. Legrest 184 is subsequently lowered until one pair of notches 196 engages inwardly projecting opposed pins 180 and treadle 104 is swung upwardly to receive the soles of the child's feet.

It is apparent from the foregoing that stroller 2 collapses into a highly compact, easy to carry, package, and the transformation from the erected position to the collapsed position or vice-versa is easily achieved merely by the manipulation of a few buttons and hinged structural members. When in the collapsed position, stroller 2 can be carried in a manner similar to a conventional shopping bag.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. A collapsible baby stroller comprising a plurality of frames including an upper frame, a front frame and a rear frame, a hinge means for swingably connection the upper ends of the front and rear frame to the upper frame in close proximity to one another in such a manner that the frames can be optionally folded form an erected position wherein the frames are disposed at predetermined angles with respect to one another to a collapsed position wherein the frames are presented in a side-by-side relation, frame locking means for holding the frames in the erected position, a backrest hingedly mounted with respect to the frames, a backrest locking means for releasably holding the backrest at a predetermined angle with respect to the frames, a seat, a support means for holding the seat substantially horizontal when the frames are in the erected position, connecting links interconnecting the front and rear frame in spaced relation to the hinge means, means for hingedly connecting the backrest at its lower end to said connecting links, said backrest locking means releasably engaging the upper frame for holding the backrest in a substantially upstanding position.

2. A baby stroller according to claim 1 and further characterized by a hinge bracket interposed between the handrail and backrest for hingedly securing the handrail to the backrest, the backrest locking means being adapted to engage the hinge bracket when the frames are in the erected position and hold the backrest in a reclined position which is more inclined than the substantially upstanding position.

3. A baby stroller according to claim 1 and further characterized by a canopy comprising a canopy frame attached to at least one of the frames, a canopy cover fitted over the canopy frame and disposed in upwardly spaced relation to the seat portion, and a transparent member fitted into the canopy cover so that a child riding on the seat can be observed from a position above and to the rear of the stroller.

* * * * *